United States Patent
Kopparapu

(10) Patent No.: US 9,443,324 B2
(45) Date of Patent: Sep. 13, 2016

(54) METHOD AND SYSTEM FOR CONSTRUCTION AND RENDERING OF ANNOTATIONS ASSOCIATED WITH AN ELECTRONIC IMAGE

(75) Inventor: Sunil Kumar Kopparapu, Thane (IN)

(73) Assignee: Tata Consultancy Services Limited (IN)

( * ) Notice: Subject to any disclaimer, the term of this patent is extended or adjusted under 35 U.S.C. 154(b) by 1141 days.

(21) Appl. No.: 13/333,558

(22) Filed: Dec. 21, 2011

(65) Prior Publication Data

US 2012/0166175 A1   Jun. 28, 2012

(30) Foreign Application Priority Data

Dec. 22, 2010 (IN) .......................... 3481/MUM/2010

(51) Int. Cl.
  *G06T 11/00* (2006.01)
  *G10L 13/00* (2006.01)
  *G09B 21/00* (2006.01)
(52) U.S. Cl.
  CPC ............... *G06T 11/00* (2013.01); *G09B 21/00* (2013.01); *G10L 13/00* (2013.01)
(58) Field of Classification Search
  CPC .... G06F 3/167; G06F 3/04842; G06F 3/048; G06F 17/28; G09G 5/14
  USPC ......... 345/629, 467; 715/230; 707/802, 999, 707/102
  See application file for complete search history.

(56) References Cited

U.S. PATENT DOCUMENTS

| 6,687,383 B1 | 2/2004 | Kanevsky et al. |
| 7,010,751 B2 | 3/2006 | Shneiderman |
| 7,493,559 B1 | 2/2009 | Wolff et al. |
| 8,400,548 B2 * | 3/2013 | Bilbrey et al. ............ 348/333.01 |
| 8,949,288 B1 * | 2/2015 | Roberts ............... G06F 17/3028 707/805 |
| 2005/0033577 A1 | 2/2005 | Bradley et al. |
| 2005/0068589 A1 | 3/2005 | Inness et al. |
| 2007/0250526 A1 * | 10/2007 | Hanna ........................... 707/102 |
| 2010/0085383 A1 | 4/2010 | Cohen et al. |

(Continued)

FOREIGN PATENT DOCUMENTS

WO   2005059830 A1   6/2005

OTHER PUBLICATIONS

Voxeo Documentation Overview, http://help.voxeo.com/browser?REQ=H&FU=STOPIC&DKEY=BT13966271794262468&DFOLDER=CHAPTER%2B13966271794262461, 2001.*

*Primary Examiner* — Chante Harrison
(74) *Attorney, Agent, or Firm* — Finnegan, Henderson, Farabow, Garrett & Dunner, LLP

(57) ABSTRACT

A method and system for construction and rendering of annotations associated with an electronic image is disclosed. The system comprises a first data repository for storing the electronic image, which has a plurality of pixels, with one or more pixels annotated at a plurality of levels, which contain descriptive characteristics of the pixel, in ascending magnitude, such that the descriptive characteristics at a subsequent level are with reference to descriptive characteristics of one or more pixels surrounding the pixel. The system comprises a second data repository for storing the annotations. An image display module is configured to display the electronic image. A pixel and level identification module is configured to receive pixel and level selection details from a user-interface. An annotation retrieval module is configured to retrieve annotations corresponding to the pixel and level selection from the second repository and renders the retrieved annotations for the electronic image.

12 Claims, 5 Drawing Sheets

(56) References Cited

U.S. PATENT DOCUMENTS

2011/0010397 A1* 1/2011 Kathpal ............... G06F 17/241 707/802
2011/0034176 A1* 2/2011 Lord ............... G06F 17/30244 455/566
2013/0124984 A1* 5/2013 Kuspa ................... H04N 9/475 715/255
2014/0082473 A1* 3/2014 Sitrick et al. ................ 715/230
2014/0120981 A1* 5/2014 King et al. ................ 455/556.1
2014/0146053 A1* 5/2014 Cragun et al. ............... 345/467

* cited by examiner

```
<description>
    <pixel, x,y>
        <level 1>
            <des> Two People Conversing </des>
        </level 1>
        <level 2>
            <des> Hair </des>
        </level 2>
        <level 3>
            <des> Head </des>
        </level 3>
        <level 4>
            <des> A person </des>
            <des> Sitting to the right </des>
        </level 4>
        :
        :
        <level x>
            <des> Black </des>
        </level x>
    </pixel, x,y>
</description>
```

Figure 2

METHOD AND SYSTEM FOR CONSTRUCTION AND RENDERING OF ANNOTATIONS ASSOCIATED WITH AN ELECTRONIC IMAGE

TECHNICAL FIELD

The invention relates to the field of annotation of electronic images. More particularly, the invention relates to the field of annotation and browsing of electronic images for the visually impaired.

BACKGROUND

Information and its accessibility has assumed a critical place in society and subsequently tools and systems are being designed to enable the visually impaired to get access to such information, particularly in the electronic world of computers. While screen readers assist the visually impaired to access information by reading out textual information on a computer screen, there exists no system of realistically presenting an electronic image on a screen to the visually impaired. This limitation becomes significant a mages convey the same concept instead of a large number of words and image creating tools have become easier to ease, both factors resulting in an increase in the use of images in documents.

Existing technologies, such as that described in WO 2005/059830 and US 2005/0068589, focus on embedding audio files in an electronic image and then playing back the audio file in response to a user request. US 2005/0033577 describes a website navigation system for the visually impaired by creating an audio website corresponding to the original website. However, the description of images in such systems is static and does not allow users a free handle to access the amount and the manner in which he or she would prefer to receive the information.

It would be highly desirable if information describing an electronic image could be made available at the level of detail that a user desires and in the manner and sequence in which a user desires.

SUMMARY

A system for rendering annotations associated with an electronic image is disclosed. The system comprises of a first data repository for storing the electronic image. The electronic image has a plurality of pixels, with one or more pixels annotated at a plurality of levels in ascending magnitude of descriptive characteristics, with each level containing one or more descriptive characteristics of the pixel such that the descriptive characteristics at a subsequent level in the ascending magnitude is with reference to descriptive characteristics of one or more pixel surrounding the pixel. The system further comprises of a second data repository for storing the annotations associated with the electronic image and an image display module configured to display the electronic image on a display device. The system further comprises of a pixel and level identification module that is configured to receive pixel selection and level selection details from a user interface and an annotation retrieval module configured to retrieve from the second repository annotations corresponding to the pixel and level selected and renders the retrieved annotations for the electronic image.

A method of annotating an electronic image having a plurality of pixels is disclosed. The method comprises of annotating a pixel at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel.

A method for rendering annotations associated with an electronic image is disclosed. The method comprises of displaying the electronic image on a display. The electronic image has a plurality of pixels with one or more pixels annotated at a plurality of levels in ascending magnitude of descriptive characteristics with each level containing one or more descriptive characteristics of the pixel, such that the descriptive characteristics at a subsequent level in the ascending magnitude is with reference to descriptive characteristics of one or more pixel surrounding the pixel. The method further comprises of receiving pixel and level selection details through a user interface and retrieving and rendering the selected level annotation for the selected pixel.

BRIEF DESCRIPTION OF DRAWINGS

Examples of embodiments of the invention are illustrated by way of illustration and not limitation in the figures of the accompanying drawings, in which like references indicate similar element and in which:

FIG. 2 is a portion of annotation showing a multi level description in accordance with an embodiment of the invention.

DETAILED DESCRIPTION

Figure 1:
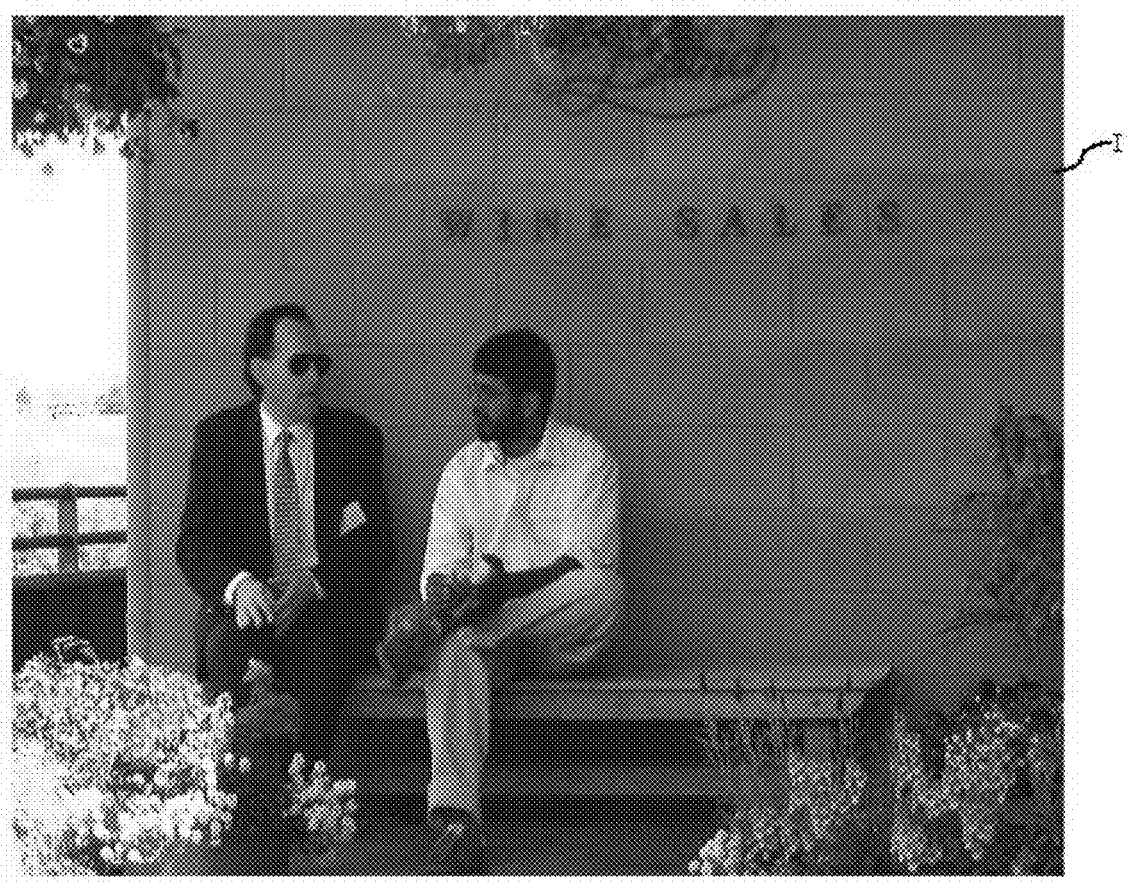
FIG. 1 is an example image which has different levels of annotation in accordance with an embodiment of the invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined together comprise the module and achieve the started purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data maybe collected as a single data set, or may be distributed over different locations including over different member disks, and may exist, at least partially, merely as electronic signals on a system or network.

Reference throughout this specification to "one embodiment", "an embodiment" or similar language means that a particular feature, structure, or characteristic described in connection with the embodiment is included in at least one embodiment of the present invention. Thus, appearances of the phrase "in one embodiment", "in an embodiment", or "in accordance with an aspect" and similar language throughout this specification may, but not necessarily, refer to the same embodiment.

A method and system for the annotation of electronic images is discussed. A method and system for rendering of annotated electronic images is also discussed. The method and system discussed provides for annotating an electronic image at, a plurality of levels varying in the density of information available. In accordance with an aspect, one or more pixels of the electronic image are to be annotated at a plurality of levels. The plurality of levels is configured in an ascending order, with each subsequent level including more details or descriptive characteristics of the pixel being annotated. The increase in magnitude of the descriptive characteristics at a subsequent level for a pixel is with reference to one or more pixels surrounding that pixel. By way of explanation and referring to FIG. 1, consider an electronic image I to be made up of M×N pixels, and for a pixel in the (k, l)th position we use the notation I(k, l). Clearly 'k' can take values from 1 to M while 'l' can take values from 1 to N. Let there be P levels of descriptions, level P being the highest which could be the color of the pixel and level 1 being the coarsest which could typically be the caption of the image. Accordingly, level p+1 has more descriptive characteristics than level p.

Referring initially to FIG. 1, an electronic image 'I' for annotation is illustrated. At one level, a lower level, the annotation of a pixel may be as simple as the caption of the image: "Two People conversing". At another level, the description may include more descriptive characteristics of the pixel by referring to one or more pixels surrounding that pixel. By way of example, the description at a higher level may be very dense and may read as "Two people, one in a black coat and a red tie with a black eye wear, balding, fair, sitting on the left and the other in a white shirt and left leg over the right leg, dark complex, with black hair and beard sitting on the left of the person in coat, sitting on a brownish wooden bench set against a dark brown checkered wall bearing a caption 'WINE SALES' written in Roman all capital Font in light brown with bushes of flowers colored red and white to their right and red and violet to their left with all the flowers in front and some more flowers handing from the top colored yellow and violet with green leaves surrounding them". This level may further include the descriptive characteristics of the previous level, namely "conversing". The description of the same pixel at the highest level may be the color of the pixel. The description at the highest level may include the descriptive characteristics of one or more levels preceding it.

Still referring to FIG. 1, for another pixel of the electronic image, the description at the higher level may include the same density of information but may vary in sequence. For example, for a pixel on the bench the description at the higher level may read as "Two people, sitting on a brownish wooden bench set against a dark brown checkered wall bearing a caption WINE SALES written in Roman all capital Font in light brown with bushes of flowers colored red and white to their right and red and violet to their left with all the flowers in front and some more flowers handing from the top colored yellow and violet with green leaves, one person is in a black coat and a red tie with a black eye wear, balding, fair, sitting on the left while the other in a white shirt and left leg over the right leg, dark complexioned, with black hair and beard, sitting on the left of the person in coat". Similarly, this level may also further include the descriptive characteristics of the previous level, namely "conversing".

While the first description above is cryptic, conveying an overall description of the image for the pixel, the second description is more informative and captures a lot more details for the pixel in the electronic image. A person looking at this image may desire annotations probably somewhere in between depending on his/her interest in the image. Additionally, the sequence of the description can change depending on the focus of the user and the pixel selected. A user may choose to hear descriptive characteristics of the surroundings (flowers, bench, wall, etc) first and then hear about the people in the image, as illustrated in the third description above. There is accordingly no fixed sequential way of describing an image and there is also no limit to the amount of description that one can associate with the image.

The electronic image could be a jpeg, pgm, ppm, gif, bmp or any other known format. The electronic image may be saved with a file name such as: in_conversation.img and the annotations of this image may be captured as a text in a different file, preferably having the same file name, such as in_conversation.des. In accordance with an embodiment the annotations may also be captured as audio.

The method of creating annotation may be partly automated. The highest level details corresponding to each pixel can be captured automatically by identifying the color of the pixel so at the level P there is a description for each pixel, or in other words there are MN annotations associated with the image. For an intermediate level, the annotation may be achieved by image segmentation that groups pixels that have similar properties, say for example the same texture. In the electronic image of FIG. 1, it could be the region associated with the brick wall behind the two people having a conversation. So a pixel in this area would have a level P description as "Brown color" while the intermediate level description would be "Brick Wall".

Note that the same pixel will have multiple annotations based on the level. For example a pixel on the head of the person sitting to the right (in white shirt) would have a level 1 annotation as "Two people conversing" or the caption of the image. A level 2 annotation of "hair", a level 3 annotation of "head", a level 4 annotation of "person to the right", "sitting on a bench", "in front of the wall", a level 5 annotation of "conversing with a person on the left" and so on until Level P description of "black", color of the pixel.

The first and last levels may equally be interchanged, such that the level 1 annotation would read as "black" and the level "P" annotation would read as "Two people conversing.

A typical text file with the annotations for a pixel, such as the in_conversation.des file would have a structure, as shown in FIG. 2. The annotations at each level are stored as a string for each pixel. Depending on the pixel identified and the level selected the corresponding annotation is extracted from the file and rendered.

Figure 3:
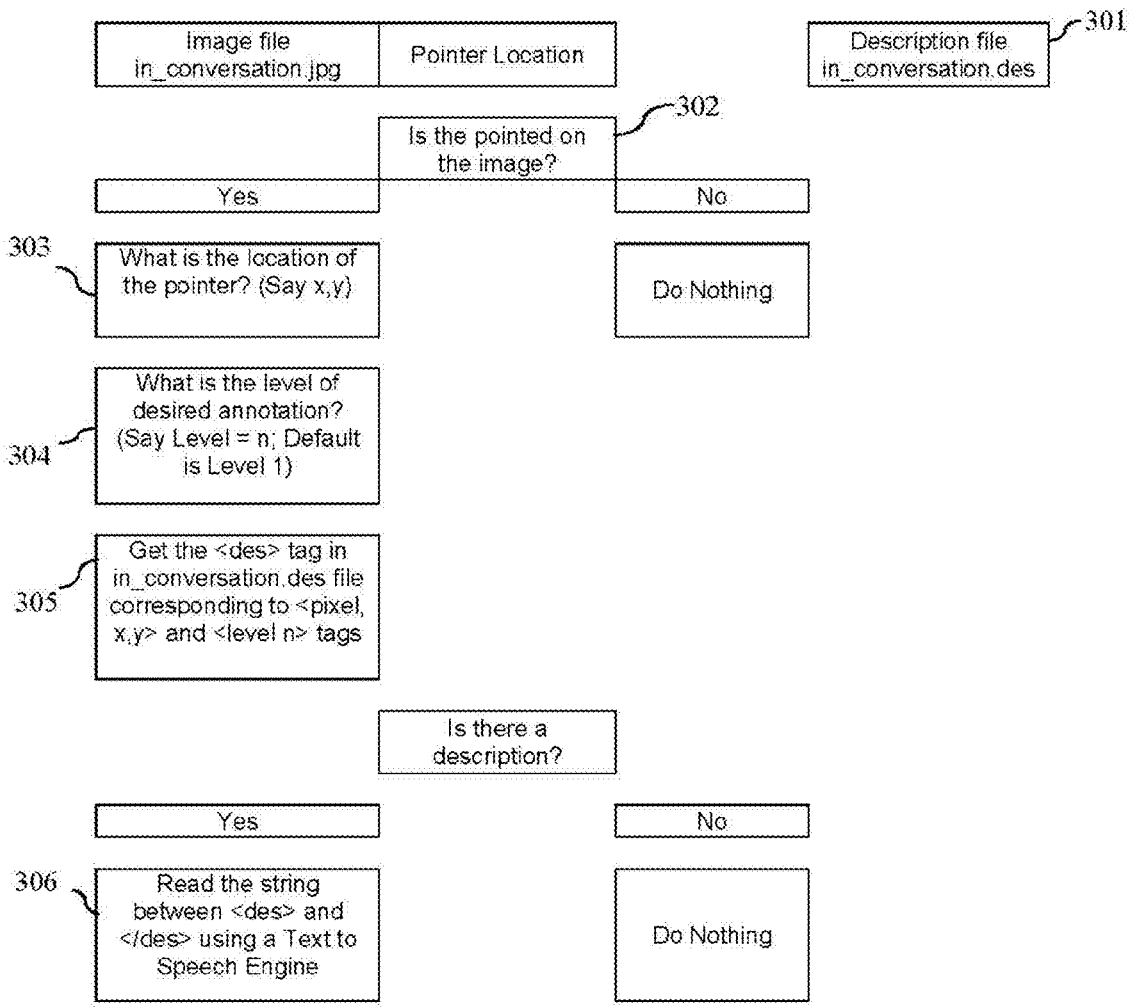
FIG. 3 shows a schematic flow diagram of a method of rendering annotations associated with an electronic image in accordance with an embodiment of the invention.

Referring next to FIG. 3, a method of rendering annotations associated with an electronic image is described. The electronic image is annotated in a manner as described with reference to FIGS. 1 and 2 above, with the annotations for the image stored in a separate file from the electronic image, as indicated by step 301. The electronic image is displayed on a suitable display, such as that of a general purpose computer. The cursor or pointer for the user interface associated with the display is identified and its location determined, as indicated by step 302. If the location of the pointer is on the image then the pixel co-ordinates for the pointer is determined and the level of information selected is determined, as indicated by step 303. If no level is determined, then the default level is taken as level 1. On receiving the pixel coordinates (location) and level (between 1 and P) information the corresponding annotation is extracted from the text file for that pixel, as indicated by step 305 and the annotation is read out using a text to speech (TTS) tool, as indicated by step 306.

In accordance with an aspect, the default level selected for a pixel is the lowest level or level 1. As the user changes the level of annotation the corresponding annotation is retrieved and rendered. The user may select the level of annotation by the use of predefined keys on a user interface. For example, the user may select, the level by the scroll button of a mouse or the use of the left and right button of the mouse.

Figure 4:
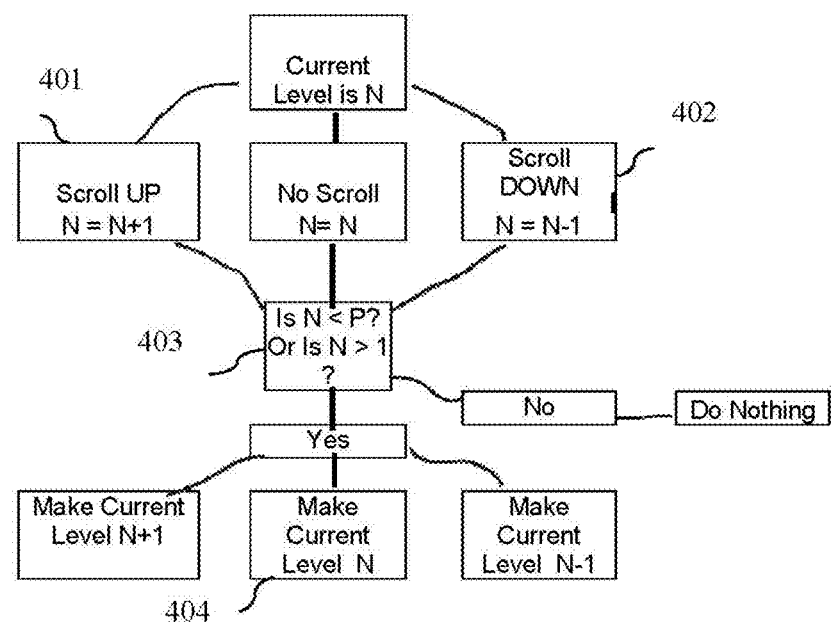
FIG. 4 shows a schematic flow diagram of a method of level selection of annotations in accordance with an embodiment of the invention.

By way of example as illustrated in FIG. 4, a scroll up of the mouse changes the level to the higher level of annotation, as indicated by step 401 while a scroll down of the mouse changes the level to the lower level of annotation, as indicated by step 402. The new level of annotation is accordingly recorded as illustrated. A scroll UP request would increase the level by 1 and a scroll DOWN would decrement the level by 1 with the condition that the changed level is in the range 1 to P. As an example if the current level is P and there is a scroll UP requested the level would stay at level P because an increment by 1 would move it out of the range 1 and P, as indicated by step 404.

In accordance with an aspect, on receiving the new pixel co-ordinates from a user interface the existing level is retained and the corresponding annotation at the same level for the new pixel is retrieved and rendered.

In accordance with another aspect on receiving new level selection input the pixel co-ordinates are not changed. In accordance with a further aspect, unless the new pixel co-ordinates are substantially different from the previous co-ordinates, the pixel selected is not changed. This is to address minor fluctuations of a pointer over the electronic image.

In accordance with another aspect, the language of annotation may be changed as per user preference. The annotated text may be translated into another language using language translation tools and the translated text may be converted to audio using language specific text to speech (TTS) tools.

Figure 5:
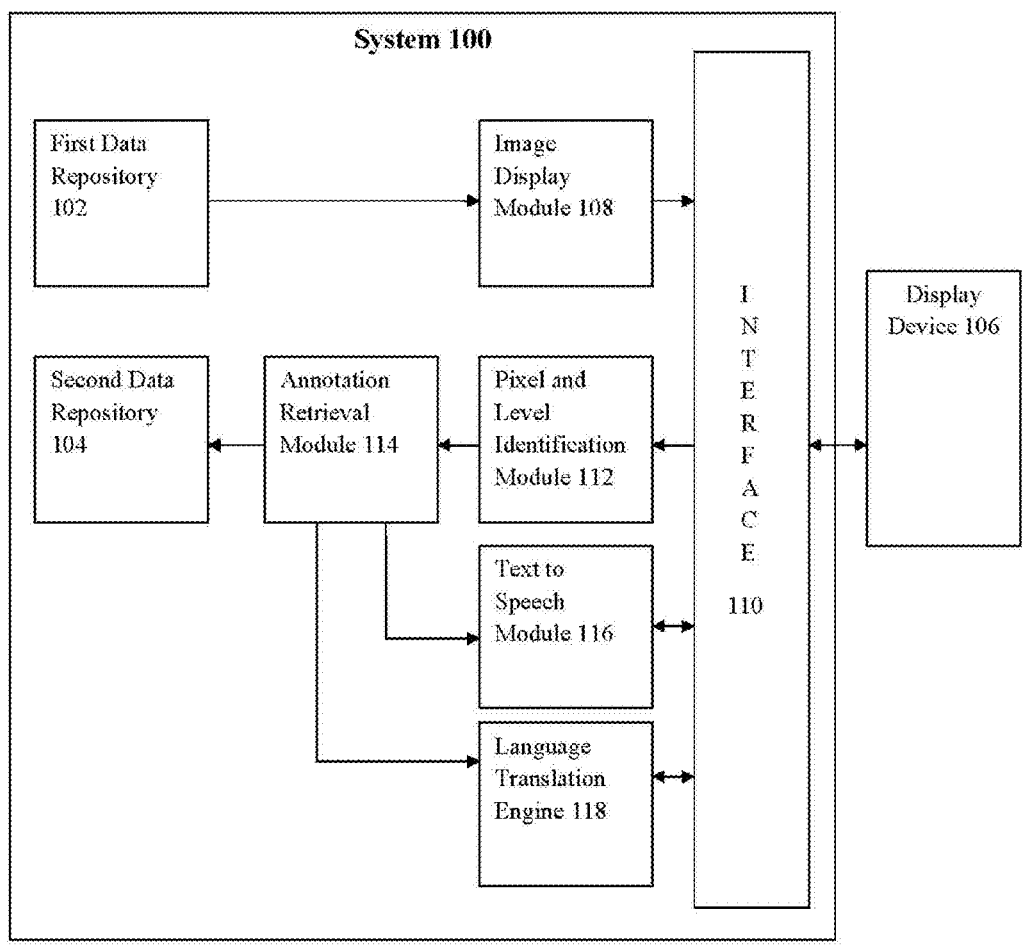
FIG. 5 is a schematic diagram showing a system for the annotation of electronic images in accordance with an embodiment of the invention.

Referring next to FIG. 5, a system 100 for rendering annotations associated with an electronic image is described. The system comprises of a first repository 102 for storing the electronic image, such as in a file in_conversation.img, that is annotated as described with reference to FIGS. 1 and 2. The system also comprises of a second data repository 104 for storing the annotations, such as in a file in_conversation.des, associated with the electronic image. The electronic image is configured for display on a display device 106 by an image display module 108 through a system interface 110. The system further comprises of a pixel and level selection module 112 that receives pixel selection and level selection details from a user interface (not shown) associated with the display device 106. The pixel and level selection is passed to an annotation retrieval module 114 that is configured to retrieve the annotations corresponding to the selected pixel and level. The retrieved text annotations are converted to audio by a text to speech module 116 and the corresponding annotation is rendered.

In accordance with an aspect, the system 100 may be configured to render annotations in another language by using a language translation module 118. The translated annotation may be converted to audio using language specific text to speech modules that may reside on the system 100 or locally on the user's machine. In accordance with another aspect, the system 100 may be configured to receive language selection inputs through the user interface associated with the display device 106.

In accordance with an aspect the system 100 is configured to receive new selections for pixel or level or both and retrieve the associated annotations from the second data repository 104 for rendering. In accordance with a further aspect, the electronic image continues to be displayed on the display device while the annotations are being retrieved.

Specific Embodiments are Described Below

A method of annotating an electronic image having a plurality of pixels comprising annotating a pixel at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel.

Such method(s), comprising annotating each of the plurality of pixels at a plurality of levels.

Such method(s), wherein the descriptive characteristics at the subsequent level include one or more descriptive characteristics of one or more levels preceding it.

Such method(s), wherein the annotation is text or audio.

Such method(s), wherein the annotation for the pixel is stored in a file separate from the electronic image.

Such method(s), wherein the annotations at the plurality of levels for all the pixels annotated is collectively stored in a file separate from the electronic image.

Such method(s), wherein a group of pixels are collectively annotated at a plurality of levels.

Such method(s), wherein at the lowest level the descriptive characteristic of the pixel is the caption of the image and at the highest level the descriptive characteristic of the pixel is the color of the pixel.

Further Specific Embodiments are Described Below

A method for rendering annotations associated with an electronic image comprising displaying on a display the electronic image, the electronic image having a plurality of pixels, with one or more pixels annotated at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel, receiving pixel and level selection details through a user interface and retrieving and rendering the selected level annotation for the selected pixel.

Such method(s), wherein the default level selected is the lowest level available.

Such method(s), further comprising retaining the level selected on receiving new pixel selection details.

Such method(s), further comprising retaining the pixel selected on receiving new level selection details.

Such method(s), wherein the annotation associated with the electronic image is text, further comprising converting the text to audio and rendering the annotation as audio.

Such method(s), wherein the annotations associated with the electronic image and the electronic image are stored separately.

Such method(s), further comprising rendering the annotation in a language other than the language of annotation by using a language translator tool and a language specific text to speech tool.

Further Specific Embodiments are Described Below

A system for rendering annotations associated with an electronic image comprising a first data repository for storing the electronic image, the electronic image having a plurality of pixels, with one or more pixels annotated at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel, a second data repository for storing the annotations associated with the electronic image, an image display module configured to display the electronic image on a display device, a pixel and level identification module configured to receive pixel selection and level selection details from a user interface and an annotation retrieval module configured to retrieve from the second repository annotations corresponding to the pixel and level selected and render the retrieved annotations for the electronic image.

Such system(s), wherein the annotations stored in the second data repository are text or audio. A system as claimed in claim 16 wherein the annotations stored in the second data repository is text, the system further comprising a text to speech unit configured to convert the text to audio.

Such system(s), wherein the pixel and level identification module is configured to receive new selection details for pixel or level or both, the system further configured to continue displaying the electronic image on a display device while retrieving from the second repository annotations corresponding to the new pixel or level or both.

Such system(s), further comprising a language translator tool and a language specific text to speech tool to render the annotation in a language other than the language of annotation.

While specific language has been used to describe the invention, any limitations arising on account of the same are not intended. As would be apparent to a person in the art, various working modifications may be made to the system in order to implement the inventive concept as taught herein.

I claim:

1. A method of annotating an electronic image having a plurality of pixels comprising:

annotating by a processor, a pixel at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixels surrounding the pixel, wherein the descriptive characteristics at the subsequent level include one or more descriptive characteristics of one or more levels preceding it, wherein at a lowest level the descriptive characteristic of the pixel is a caption of the electronic image and at a highest level the descriptive characteristic of the pixel is a color of the pixel;

storing a plurality of annotations in a file separate from the electronic image by a first data repository, wherein the annotations at the plurality of levels for the annotated pixels is collectively stored in the file separate from the electronic image; and displaying the electronic image and one of the stored annotations, wherein the displayed electronic image and the one of the stored annotations is determined based on a cursor location relative to a plurality of pixel coordinates within a user interface.

2. The method as claimed in claim 1, comprising annotating each of the plurality of pixels at a plurality of levels, wherein a pixel selection and a level selection details are configured to retrieve the plurality of annotations corresponding to a selected pixel and level, wherein the retrieved annotations are converted to audio by a text to speech module.

3. The method as claimed in claim 1, wherein the annotation is at least one of text and audio.

4. A method for rendering annotations associated with an electronic image comprising:

displaying on a display the electronic image, the electronic image having a plurality of pixels, with one or more pixels annotated at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel;

receiving pixel and level selection details through a user interface;

retrieving and rendering the selected level annotation for the selected pixel; wherein a level selected by default is a lowest level available, wherein at a lowest level the descriptive characteristic of the pixel is a caption of the electronic image and at a highest level the descriptive characteristic of the pixel is a color of the pixel;

storing a plurality of annotations in a file separate from the electronic image, wherein the annotations at the plurality of levels for the annotated pixels is collectively stored in the file separate from the electronic image; and displaying the electronic image, wherein the displayed electronic image is determined based on a cursor location relative to a plurality of pixel coordinates within a user interface.

5. The method as claimed in claim 4, further comprising retaining the level selected on receiving new pixel selection details.

6. The method as claimed in claim 4, further comprising retaining the pixel selected on receiving new level selection details.

7. The method as claimed in claim 4, wherein the annotation associated with the electronic image is text, further comprising converting the text to audio and rendering the annotation as audio.

8. The method as claimed in claim 4, further comprising rendering the annotation in a language other than the language of annotation by using a language translator module and a language specific text to speech tool.

9. A system for rendering annotations associated with an electronic image comprising:
 a first data repository for storing the electronic image; the electronic image having a plurality of pixels, with one or more pixels annotated at a plurality of levels in ascending magnitude of descriptive characteristics, with each level containing one or more descriptive characteristics of the pixel, such that the descriptive characteristics at a subsequent level in the ascending magnitude is with reference to descriptive characteristics of one or more pixel surrounding the pixel retrieving and rendering the selected level annotation for the selected pixel; wherein a level selected by default is a lowest level available, wherein at a lowest level the descriptive characteristic of the pixel is a caption of the electronic image and at a highest level the descriptive characteristic of the pixel is a color of the pixel;
 a second data repository for storing the annotations associated with the electronic image wherein the annotations at the plurality of levels for the annotated pixels is collectively stored in a file separate from the electronic image;
 an image display module configured to display the electronic image on a display device, wherein the displayed electronic image is determined based on a cursor location relative to a plurality of pixel coordinates within a user interface;
 a pixel and level identification module configured to receive pixel selection and level selection details from a user interface; and
 an annotation retrieval module configured to retrieve from the second repository annotations corresponding to the pixel and level selected and render the retrieved annotations for the electronic image;
 wherein the pixel and level identification module is configured to receive new selection details for pixel or level or both, the system further configured to continue displaying the electronic image on a display device while retrieving from the second repository annotations corresponding to the new pixel or level or both.

10. The system as claimed in claim 9, wherein the annotations stored in the second data repository are text or audio.

11. The system as claimed in claim 9, wherein the annotations stored in the second data repository is text, the system further comprising a text to speech unit configured to convert the text to audio.

12. The system as claimed in claim 9, further comprising a language translator tool and a language specific text to speech tool to render the annotation in a language other than the language of annotation.

* * * * *